United States Patent
Izaki (10) Patent No.: US 10,785,405 B2
(45) Date of Patent: Sep. 22, 2020

(54) ELECTRONIC DEVICE, CONTROL METHOD, AND STORAGE MEDIUM

(71) Applicant: CANON KABUSHIKI KAISHA, Tokyo (JP)

(72) Inventor: Yuko Izaki, Kawasaki (JP)

(73) Assignee: CANON KABUSHIKI KAISHA, Tokyo (JP)

( * ) Notice: Subject to any disclaimer, the term of this patent is extended or adjusted under 35 U.S.C. 154(b) by 0 days.

(21) Appl. No.: 16/148,263

(22) Filed: Oct. 1, 2018

(65) Prior Publication Data

US 2019/0109982 A1 Apr. 11, 2019

(30) Foreign Application Priority Data

Oct. 5, 2017 (JP) .................................. 2017-195377

(51) Int. Cl.
*H04N 5/232* (2006.01)
*H04N 5/235* (2006.01)

(52) U.S. Cl.
CPC ....... *H04N 5/23222* (2013.01); *H04N 5/2351* (2013.01); *H04N 5/2352* (2013.01); *H04N 5/2353* (2013.01); *H04N 5/23209* (2013.01); *H04N 5/23216* (2013.01); *H04N 5/23245* (2013.01); *H04N 5/232933* (2018.08)

(58) Field of Classification Search
CPC . H04N 5/353–3537; H04N 5/235–243; G03B 7/00–28; G03B 2207/00–005
USPC ............................ 348/362–368; 396/213–262
See application file for complete search history.

(56) References Cited

U.S. PATENT DOCUMENTS

| | | | | |
|---|---|---|---|---|
| 2008/0174674 A1* | 7/2008 | Hsieh | ..................... | G03B 7/003 348/229.1 |
| 2010/0091176 A1* | 4/2010 | Cha | .......................... | G03B 7/08 348/365 |
| 2011/0193984 A1* | 8/2011 | Kitaya | ..................... | G06T 1/00 348/222.1 |
| 2011/0293259 A1* | 12/2011 | Doepke | ..................... | G03B 7/08 396/236 |
| 2015/0350533 A1* | 12/2015 | Harris | ................... | H04N 5/2355 348/362 |
| 2016/0205307 A1* | 7/2016 | Kosaka | ..................... | G06T 7/20 348/362 |

FOREIGN PATENT DOCUMENTS

JP 2010093476 A 4/2010

* cited by examiner

*Primary Examiner* — Xi Wang
(74) *Attorney, Agent, or Firm* — Rossi, Kimms & McDowell LLP (57) ABSTRACT

There is provided an electronic device. A changing unit changes a setting value of a setting item selected from a plurality of setting items to a setting value that is selected, in accordance with a user operation, from among a plurality of setting values including a first setting value, for which a setting value is automatically determined. A determination unit automatically determines, for a setting item for which the first setting value was set, a setting value. A control unit performs control such that, when, in a state in which a setting value of a first setting item for which the first setting value was set has been automatically determined, a user operation is made to change a setting value of a second setting item, the setting value of the first setting item is not changed.

13 Claims, 6 Drawing Sheets

ELECTRONIC DEVICE, CONTROL METHOD, AND STORAGE MEDIUM

BACKGROUND OF THE INVENTION

Field of the Invention

The present invention relates to an electronic device, a control method, and a storage medium.

Description of the Related Art

Japanese Patent Laid-Open No. 2010-93476 discloses that setting of the exposure time, the aperture value, and the ISO speed can be independently switched between manual setting and automatic setting.

In the method disclosed in Japanese Patent Laid-Open No. 2010-93476, if the setting of the exposure time, the aperture value, and the ISO speed is switched to automatic setting, setting values are respectively set so that a correct exposure is achieved, but when a user wants to change the automatically set value, he or she needs to respectively switch the setting of the setting values from automatic setting to manual setting.

SUMMARY OF THE INVENTION

The present invention was made in view of such circumstances, and provides an electronic device that has improved operability when setting a plurality of setting items.

According to a first aspect of the present invention, there is provided an electronic device comprising: a changing unit configured to change a setting value of a setting item selected from a plurality of setting items to a setting value that is selected, in accordance with a user operation, from among a plurality of setting values including a first setting value, for which a setting value is automatically determined; a determination unit configured to automatically determine, for a setting item for which the first setting value was set, a setting value from among a plurality of setting values; and a control unit configured to perform control such that, when, in a state in which a setting value of a first setting item for which the first setting value was set has been automatically determined by the determination unit, a user operation is made to change a setting value of a second setting item, which is different from the first setting item, the setting value of the first setting item is not changed from the setting value determined by the determination unit to the first setting value.

According to a second aspect of the present invention, there is provided a control method executed by an electronic device, comprising: changing a setting value of a setting item selected from a plurality of setting items to a setting value that is selected, in accordance with a user operation, from among a plurality of setting values including a first setting value, for which a setting value is automatically determined; automatically determining, for a setting item for which the first setting value was set, a setting value from among a plurality of setting values; and performing control such that, when, in a state in which a setting value of a first setting item for which the first setting value was set has been automatically determined by the determining, a user operation is made to change a setting value of a second setting item, which is different from the first setting item, the setting value of the first setting item is not changed from the setting value determined by the determining to the first setting value.

According to a third aspect of the present invention, there is provided a non-transitory computer-readable storage medium which stores a program for causing a computer to execute a control method comprising: changing a setting value of a setting item selected from a plurality of setting items to a setting value that is selected, in accordance with a user operation, from among a plurality of setting values including a first setting value, for which a setting value is automatically determined; automatically determining, for a setting item for which the first setting value was set, a setting value from among a plurality of setting values; and performing control such that, when, in a state in which a setting value of a first setting item for which the first setting value was set has been automatically determined by the determining, a user operation is made to change a setting value of a second setting item, which is different from the first setting item, the setting value of the first setting item is not changed from the setting value determined by the determining to the first setting value.

Further features of the present invention will become apparent from the following description of exemplary embodiments with reference to the attached drawings.

DESCRIPTION OF THE EMBODIMENTS

Hereinafter, embodiments of the present invention will be described with reference to the attached drawings. It should be noted that the technical scope of the present invention is defined by the claims, and is not limited by the following respective embodiments. Also, not all of the combinations of the aspects that are described in the embodiments are necessarily essential to the present invention. Also, the aspects that are described in the respective embodiments can be combined as appropriate.

First Embodiment

Figure 1A:
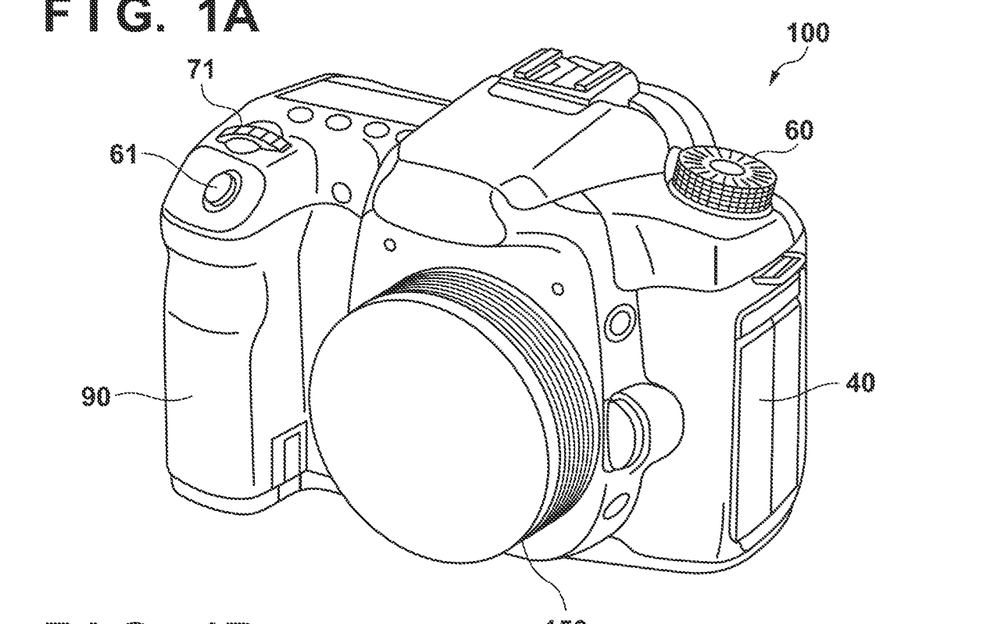
FIG. 1A is a front perspective view of a digital camera 100.
Figure 1B:
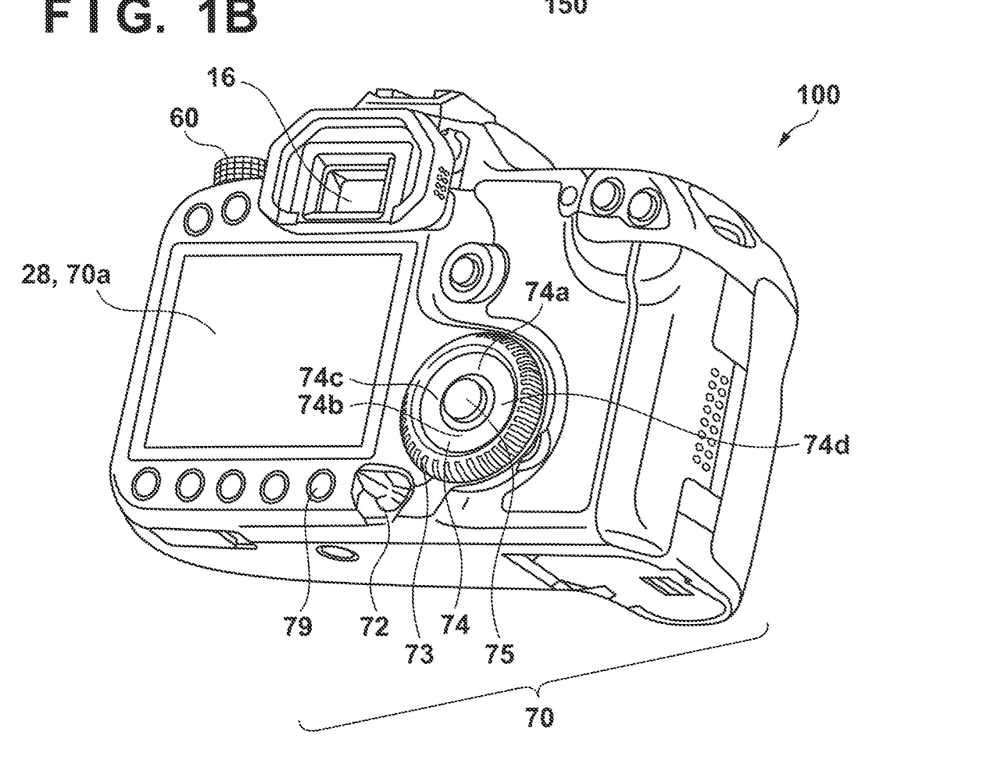
FIG. 1B is a rear perspective view of the digital camera 100.

FIG. 1A is a front perspective view showing a digital camera 100, which serves as an example of an electronic apparatus (image capturing control apparatus), and FIG. 1B is a rear perspective view showing the digital camera 100. In FIGS. 1A and 1B, a display unit 28 is a display unit for displaying an image or various types of information. A touch panel 70a is integrated with the display unit 28, and a user can touch the surface of the display unit 28 to intuitively select items or an object position displayed on the display unit 28. A shutter-release button 61 is an operation unit for giving a shooting instruction. A mode selection switch 60 is an operation unit for switching between various modes. A terminal cover 40 is a cover for protecting a connector (not-shown) for a connection cable that connects the digital camera 100 and an external apparatus to each other. A main electronic dial 71 is a rotating operation member, and by rotating the main electronic dial 71, setting values such as shutter speed or diaphragm aperture can be changed, for example. A power supply switch 72 is an operation member for turning on/off the digital camera 100. A sub electronic dial 73 is a rotating operation member for moving a selection frame, scrolling images, and the like. A cross key 74 is a four-directional key including an upper key 74a, a lower key 74b, a left key 74c, and a right key 74d, which can be pressed down, and can give an instruction to, for example, move a cursor or the like in the pressed direction. A SET button 75 is a push button for use mainly in determining selection items and the like. A reproduction button 79 is an operation button for switching between a shooting mode and a reproduction mode. When, during the shooting mode, the reproduction button 79 is pressed down, the digital camera 100 is switched to the reproduction mode, so that the latest image stored in a recording medium 200 (described later) can be displayed on the display unit 28. The shutter-release button 61, the main electronic dial 71, the power supply switch 72, the sub electronic dial 73, the cross key 74, the SET button 75, and the reproduction button 79 are included in operation unit 70. A viewfinder 16 is an eyepiece viewfinder through which a user observes a focusing screen 13 (described later) to check the focus and composition of an optical image of an object taken in through a lens unit 150. A grip 90 is a holding portion that has a shape that makes it easy to be gripped by a user's right hand when he or she holds the digital camera 100.

Figure 2:
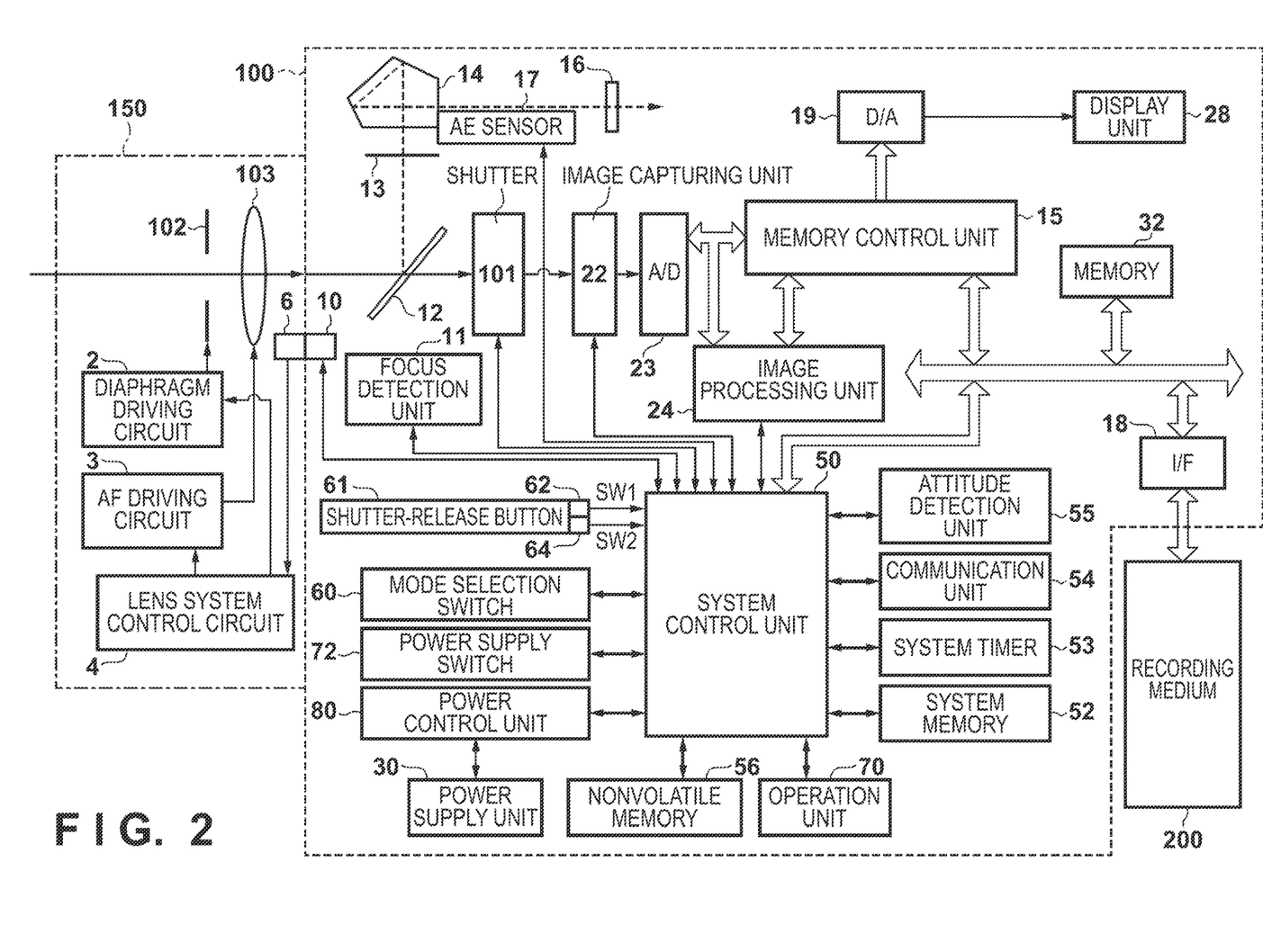
FIG. 2 is a block diagram illustrating an example of a configuration of the digital camera 100.

FIG. 2 is a block diagram showing an example of a configuration of the digital camera 100 according to the present embodiment. In FIG. 2, the lens unit 150 includes a shooting lens, and is replaceable.

A lens 103 is typically constituted by a plurality of lenses, but is simplified here and is shown only with one lens. A communication terminal 6 is a communication terminal through which the lens unit 150 communicates with the digital camera 100. A communication terminal 10 is a communication terminal through which the digital camera 100 communicates with the lens unit 150. The lens unit 150 communicates with a system control unit 50 through the communication terminals 6 and 10. Using a lens system control circuit 4, the lens unit 150 controls a diaphragm driving circuit 2 to drive a diaphragm 102, and controls an AF driving circuit 3 to displace the position of the lens 103, thereby bringing the object into focus.

An AE sensor 17 performs photometry to obtain the luminance of an object image formed on the focusing screen 13 through the lens unit 150 and a quick return mirror 12.

A focus detection unit 11 (AF sensor) is a phase difference detection type AF sensor that captures an image incident thereon via the quick return mirror 12 and a sub mirror (not-shown), and outputs information relating to a defocus amount to the system control unit 50. The system control unit 50 controls the lens unit 150 based on the information relating to a defocus amount to perform phase difference AF. Note that the AF method may be contrast AF instead of phase difference AF. Furthermore, the phase difference AF may also be performed, instead of using the focus detection unit 11, based on the defocus amount detected on an image capturing surface of an image capturing unit 22 (image capturing surface phase difference AF).

The quick return mirror 12 receives an instruction from the system control unit 50 at the time of exposure, live view shooting, or moving image shooting, and is raised and lowered by an actuator (not-shown). The quick return mirror 12 is a mirror for switching luminous flux entering the lens 103 between the viewfinder 16 side and the image capturing unit 22 side. The quick return mirror 12 is usually arranged so as to reflect and guide the luminous flux to the viewfinder 16, but when shooting is performed or live view is displayed, the quick return mirror 12 kicks upward and recedes from the luminous flux so as to guide the luminous flux to the image capturing unit 22 (mirror up). Furthermore, the central portion of the quick return mirror 12 is a half mirror such that some beams of light can pass through, and allows a portion of the luminous flux to pass through and enter the focus detection unit 11, which is a unit for performing focus detection.

By observing an image formed on the focusing screen 13 via a pentaprism 14 and the viewfinder 16, the user can check the focus and composition of an optical image of an object taken in through the lens unit 150.

A shutter 101 controls the exposure time of the image capturing unit 22 in accordance with the control of the system control unit 50. The image capturing unit 22 is an image sensor constituted by a CCD or CMOS sensor or the like that converts an optical image into electric signals. An A/D converter 23 converts an analog signal into a digital signal. The A/D converter 23 is used to convert an analog signal output from the image capturing unit 22 into a digital signal.

An image processing unit 24 performs resizing processing, such as predetermined pixel interpolation and reduction, and color conversion processing with respect to data from the A/D converter 23 or data from a memory control unit 15. Furthermore, the image processing unit 24 performs predetermined calculation processing using captured image data, and the system control unit 50 performs exposure control and ranging control based on the obtained calculation results. Accordingly, AF (Automatic Focus) processing, AE (Automatic Exposure) processing, and EF (flash pre-emission) processing of the TTL (Through the Lens) type are performed. The image processing unit 24 also performs predetermined calculation processing using the captured image data, and AWB (Automatic White Balance) processing of the TTL type based on the obtained calculation results.

The data output from the A/D converter 23 is written into a memory 32 via both the image processing unit 24 and the memory control unit 15, or directly via the memory control unit 15. The memory 32 stores the image data that was obtained from the image capturing unit 22 and converted into digital data by the AD converter 23, and image data to be displayed on the display unit 28. The memory 32 has a storage capacity that is sufficient for storing a predetermined number of still images as well as moving images and audio of a predetermined length of time.

The memory 32 also functions as a memory for image display (video memory). A D/A converter 19 converts the image data for display stored in the memory 32 into an analog signal and supplies the display unit 28 with the analog signal. In this way, the image data for display that was written into the memory 32 is displayed by the display unit 28 via the D/A converter 19. The display unit 28 performs display on the display unit such as an LCD in accordance with the analog signal from the D/A converter 19. As a result of the digital signals that have been subjected to A/D conversion once by the A/D converter 23 and were stored in the memory 32 being converted into analog signals by the D/A converter 19, and the analog signals being successively transmitted to the display unit 28 so as to be displayed thereon, an electronic viewfinder can be realized and through image display can be performed (live view display).

A nonvolatile memory 56 is, for example, an EEPROM, which is electrically erasable and recordable by the system control unit 50. In the nonvolatile memory 56, constants, programs, and the like for operating the system control unit 50 are stored. In this context, "programs" may refer to programs for executing various flowcharts that will be described later in the present embodiment.

The system control unit 50 includes at least one processor, and controls the entire digital camera 100. The system control unit 50 realizes, by executing the above-described programs stored in the nonvolatile memory 56, the procedures of the present embodiment that will be described later. A system memory 52 is a RAM. In the system memory 52, constants and variables for operating the system control unit 50, the programs read out from the nonvolatile memory 56, and the like are expanded. Furthermore, the system control unit 50 also controls the memory 32, the D/A converter 19, the display unit 28, and the like to perform display control. A system timer 53 is a timer unit for measuring time periods for various types of controls and the time of an integrated clock.

The mode selection switch 60, the shutter-release button 61, and the operation unit 70 are operation members for inputting various types of instructions into the system control unit 50. The mode selection switch 60 switches the operation mode of the system control unit 50 to any of a still image recording mode, a moving image recording mode, a reproduction mode, and the like. The still image recording mode includes an automatic shooting mode, an automatic scene determination mode, a manual mode, an aperture-priority mode (Av mode), and a shutter-speed-priority mode (Tv mode). Various scene modes in each of which scene-specific shooting setting is made, a program AE mode, a custom mode, and the like are included. Using the mode selection switch 60, the mode is directly switched to any of these modes included in the menu screen. Alternatively, it is also possible to switch, using the mode selection switch 60, to the menu screen and then to switch, using another operation member, to any of these modes included in the menu screen. Similarly, the moving image recording mode as well may include a plurality of modes.

While the shutter-release button 61 provided on the digital camera 100 is being operated, that is, pressed half-way (the shooting preparation instruction), the first shutter switch 62 is turned on and generates a first shutter switch signal SW1. Upon receiving the first shutter switch signal SW1, the system control unit 50 starts operations of the AF (Automatic Focus) processing, the AE (Automatic Exposure) processing, the AWB (Automatic White Balance) processing, the EF (flash pre-emission) processing, and the like.

When the operation of the shutter-release button 61 is complete, that is, the shutter-release button 61 is pressed fully (the shooting instruction), the second shutter switch 64 is turned ON and generates a second shutter switch signal SW2. Upon receiving the second shutter switch signal SW2, the system control unit 50 starts operations of a series of shooting processing from reading out signals from the image capturing unit 22 to writing image data to the recording medium 200.

For example, by selecting and operating various function icons displayed on the display unit 28, appropriate functions for each situation are assigned to the operation members of the operation unit 70, and the operation members thus act as various function buttons. Examples of these function buttons include an end button, a return button, an image scrolling button, a jump button, a narrow-down button, and an attribute change button. For example, a menu screen that allows various settings to be made is displayed on the display unit 28 by pressing the menu button. The user can make various settings intuitively by using the menu screen displayed on the display unit 28, the four directional key (cross key 74) including the upper, lower, left and right keys, the SET button 75, and the like.

The operation unit 70 include the various operation members serving as input units (accepting unit), which accept a user operation. The operation unit 70 include at least the following operation members: the shutter-release button 61, the main electronic dial 71, the power supply switch 72, the sub electronic dial 73, the cross key 74, the SET button 75, and the reproduction button 79.

A power control unit 80 is constituted by, for example, a battery detection circuit, a DC-DC converter, a switch circuit for switching over the block to be supplied with power, and detects whether a battery has been inserted or not, the type of the battery, and the residual capacity thereof. Further, the power control unit 80 controls the DC-DC converter in accordance with the detection results and an instruction from the system control unit 50, and supplies the necessary voltage for the necessary length of time to each of the units including the recording medium 200.

A power supply unit 30 comprises a primary battery such as an alkaline battery or a lithium battery, a secondary battery such as a NiCd battery, a NiMH battery, or a Li battery, an AC adaptor, or the like. A recording medium I/F 18 is an interface with the recording medium 200 such as a memory card or a hard disk. The recording medium 200 is a recording medium such as a memory card for recording shot images, and is constituted by a semiconductor memory, a magnetic disk, or the like. The power supply switch 72 is a switch for switching the digital camera 100 on and off.

A communication unit 54 is connected to an external apparatus wirelessly or via a wired cable, and transmits and receives a video signal or an audio signal. The communication unit 54 is also connectable to a wireless LAN (Local Area Network) or the Internet. The communication unit 54 can transmit an image (including a through image) captured by the image capturing unit 22 and an image stored in the recording medium 200, or can receive image data or various other information from the external apparatus.

An attitude detection unit 55 detects the attitude of the digital camera 100 with respect to the gravity direction. Based on the attitude detected by the attitude detection unit 55, it is possible to discern whether an image captured by the image capturing unit 22 has been shot with the digital camera 100 held in the landscape or portrait orientation. The system control unit 50 can add information about the orientation information corresponding to the attitude detected by the attitude detection unit 55 to the image file of the image captured by the image capturing unit 22, and can rotate and record the captured image. An acceleration sensor, a gyro sensor, and the like may be used as an attitude detection unit 55.

The digital camera 100 includes, among the operation unit 70, the touch panel 70a (see FIG. 1B) that is capable of detecting a touch operation made on the display unit 28. The touch panel 70a and the display unit 28 can be constructed as a single integrated unit. For example, the touch panel 70a is constructed in such a manner that the transmittance of light will not interfere with the display presented by the display unit 28, and is attached to the uppermost layer of the display face of the display unit 28. In addition, input coordinates on the touch panel 70a and display coordinates on the display unit 28 are correlated. As a result, a GUI (Graphical User Interface) can be constructed that makes it possible for the user to directly manipulate the screen displayed on the display unit 28. The system control unit 50 is capable of detecting the following touch operations and conditions obtained by contacting the touch panel 70a.

Newly touching of the touch panel 70a by a finger or pen which has not been in contact with the touch panel 70a. That is, a start of a touch (referred to as "touch-down" below).

A state in which the touch panel 70a is in contact with a finger or pen (referred to as "touch-on" below).

Movement of a finger or pen while in contact with the touch panel 70a (referred to as "touch-move" below).

Lifting of a finger or pen that has been in contact with the touch panel 70a. That is, an end of the touch (referred to as "touch-up" below).

A state in which the touch panel 70a is not being touched at all (referred to as "touch-off" below).

When touch-down is detected, the touch-on state is also detected at the same time. Unless touch-up is detected after touch-down, touch-on usually continues to be detected. Touch-move is also detected in a state where touch-on is being detected. Even if touch-on is being detected, touch-move is not detected unless the touch position moves. After touch-up of all the fingers or a pen that have been in contact with the screen is detected, the touch-OFF state is entered.

These operations/conditions and position coordinates at which the touch panel 70a is being touched by the finger or pen are communicated to the system control unit 50 through an internal bus. The system control unit 50 determines, based upon the information thus communicated, what kind of operation was performed on the touch panel 70a. As for "touch-move", the determination can be also made for every vertical component and horizontal component on the touch panel 70a with regard to the direction of movement of the finger or pen, which is moved on the touch panel 70a, based upon a change in the position coordinates. Further, if a touch-down on the touch panel 70a, a predetermined touch-move, and then a touch-up is detected, it is determined that a stroke has been drawn. An operation of quickly drawing a stroke is referred to as a "flick". An operation in which a finger is touched against the touch panel, swiftly moved a certain distance, and then lifted away will be referred to as a "flick", in other words, a flick is an operation in which a finger is swiftly flicked across the touch panel 70a. If a touch-move with a predetermined distance or longer and a predetermined speed or higher is detected, and then a touch-up is detected, it can be determined that a flick has been performed. Further, if a touch-move with a predetermined distance or longer and a speed less than the predetermined speed is detected, it can be determined that a drag has been performed. The touch panel 70a may employ a method that relies upon any of the following: resistive film, electrostatic capacitance, surface acoustic waves, infrared radiation, electromagnetic induction, image recognition and optical sensing. There are methods in which a touch is detected based on contact with the touch panel, as well as methods in which a touch is detected based on approach of a finger or a pen to the touch panel, and any method may be employed.

Figure 3A:
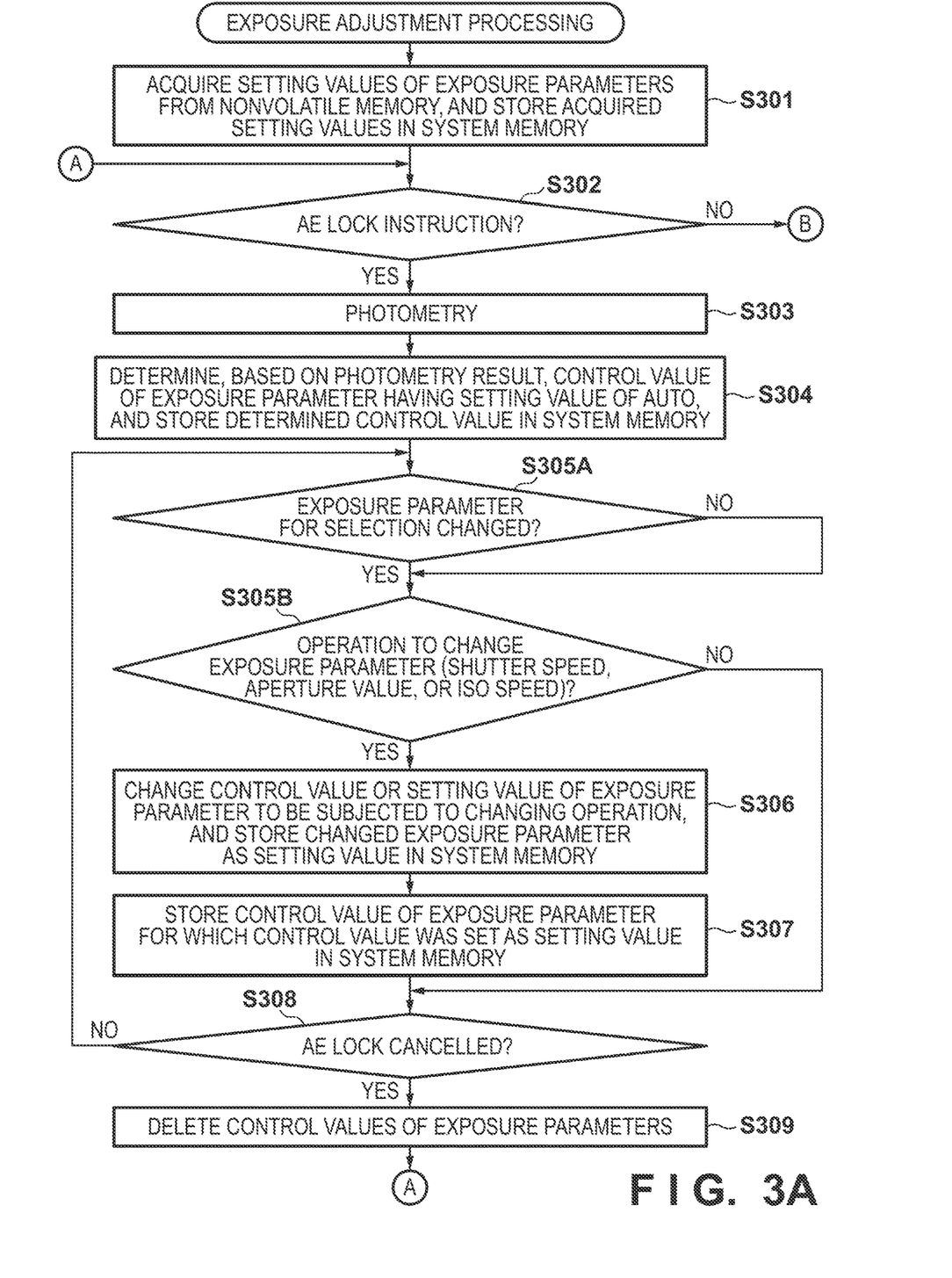
FIGS. 3A and 3B illustrate a flowchart of exposure adjustment processing according to a first embodiment.
Figure 3B:
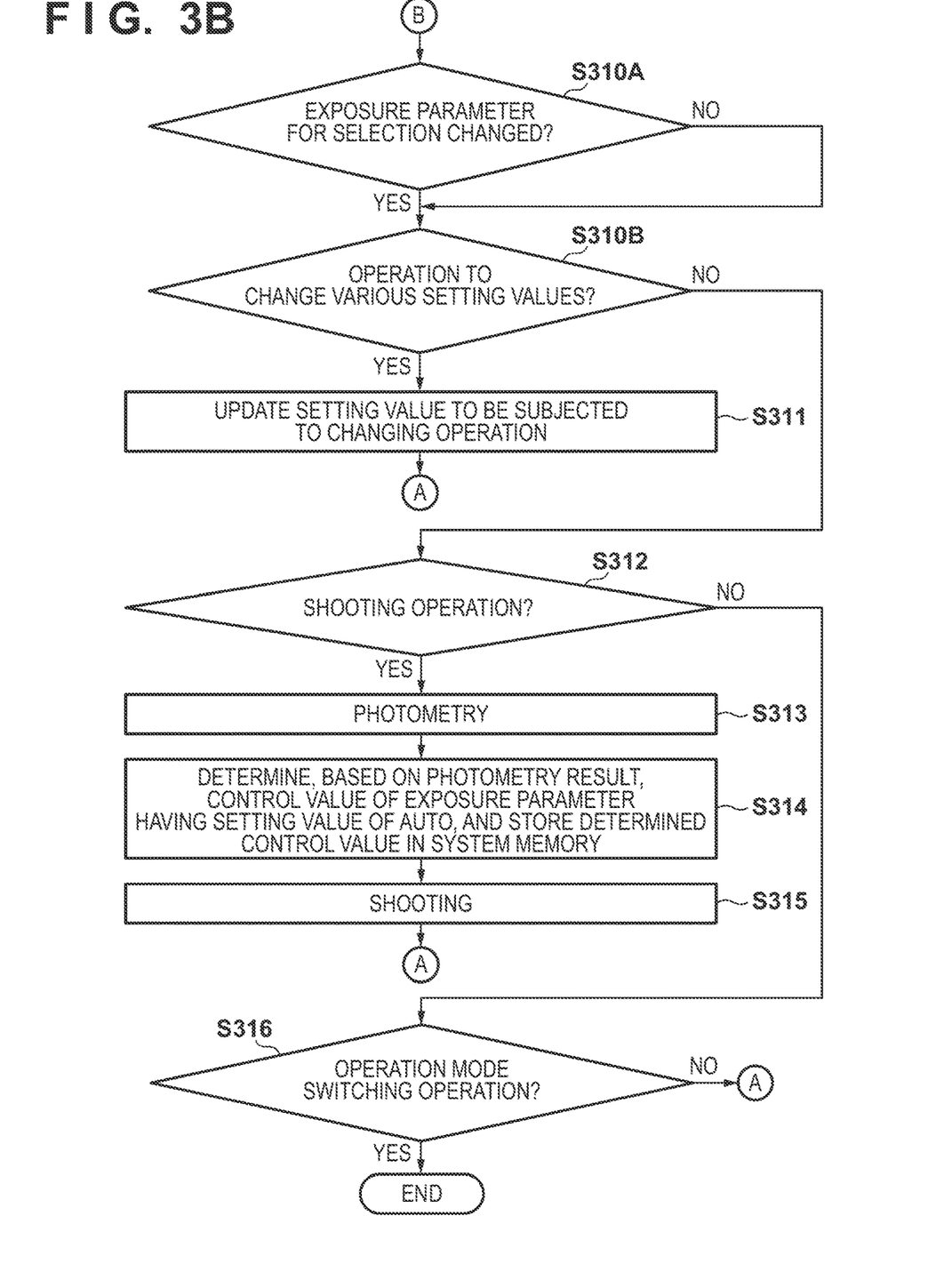

The following will describe exposure adjustment processing that is executed by the digital camera 100 with reference to FIGS. 3A and 3B. The processing of steps of this flowchart is executed, unless otherwise noted, by the system control unit 50 expanding a program stored in the nonvolatile memory 56 onto the system memory 52 and executing the expanded program. The procedure of this flowchart is started when the digital camera 100 is set to an exposure adjustment mode.

Note that the "exposure adjustment mode" is one of the operation modes of the digital camera 100. In the exposure adjustment mode, a user can set the shutter speed, the aperture value, and the ISO speed to specific values, or can set one or all of the shutter speed, aperture value, and the ISO speed to "Auto". "Auto" refers to a setting value indicating that an actual value is automatically set based on a photometry result.

In step S301, the system control unit 50 acquires, from the nonvolatile memory 56, setting values of exposure parameters (exposure control-related setting items) for the exposure adjustment mode, and stores the acquired setting values in the system memory 52. In the following description, it is assumed that the exposure parameters include the shutter speed, the aperture value, and the ISO speed, but the exposure parameters of the present embodiment are not limited thereto. After having acquired the exposure parameters, the digital camera 100 enters a shooting standby state. In the shooting standby state, the system control unit 50 displays a display screen as shown in, for example, FIG. 5A on the display unit 28. The example shown in FIG. 5A corresponds to a case where all of the shutter speed, the aperture value, and the ISO speed are set to "Auto".

In step S302, the system control unit 50 determines whether or not an instruction to fix the exposure (AE lock instruction) has been given. If the AE lock instruction has been given, the procedure moves to step S303, otherwise the procedure moves to step S310A.

In step S303, the system control unit 50 performs photometry. In step S304, the system control unit 50 determines, based on the photometry result, values for achieving the correct exposure under the current shooting conditions, with respect to the exposure parameters that were set to "Auto". In the following description, a value of an exposure parameter determined based on a photometry result is referred to as a "control value" of the exposure parameter, in order to be distinguished from the setting value acquired from the nonvolatile memory 56. The system control unit 50 stores the determined control values in the system memory 52. Accordingly, it is possible to set the exposure so that the correct exposure is achieved under the current shooting conditions. As a result of the processing in step S304, the display screen of the display unit 28 changes from that in FIG. 5A to FIG. 5B, for example. In the example shown in FIG. 5B, the control values of the shutter speed, the aperture value, and the ISO speed are respectively determined as $\frac{1}{1000}$ seconds, 2.0, and 400 (where "1000" corresponding to the shutter speed means $\frac{1}{1000}$ seconds). Note that if a subset of the shutter speed, the aperture value, and the ISO speed was set to "Auto", the setting value (control value) of the exposure parameter (item) set to "Auto" is calculated so that the correct exposure is achieved based on a manually set setting value. In other words, a case where the shutter speed was set to "Auto" and the aperture value was set by a user corresponds to an Av mode (aperture value-priority mode), and the shutter speed is set so that the correct exposure is achieved based on the set aperture value. Accordingly, in the exposure adjustment mode, as a result of the exposure parameters being set to "Auto" or being set to a setting value by a user, exposure adjustment that corresponds to the Av mode or a Tv mode can be performed within one mode.

In step S305A, the system control unit 50 determines whether or not an operation to change the exposure parameter for selection has been made. Changing of the exposure parameter for selection is possible in accordance with a rotation of the sub electronic dial 73. If no such operation has been made in step S305A, the state is such that the exposure parameter that was selected when the AE lock instruction was given in step S302 remains selected, and in the next processing in step S305B, the value of the selected exposure parameter is changed. Note that the shutter speed may be set as the exposure parameter that is initially selected when the digital camera 100 is powered on.

In step S305B, the system control unit 50 determines whether or not an operation to change the value (control value or setting value) of the selected exposure parameter (the shutter speed, the aperture value, or the ISO speed) has been performed. Changing of the value of the selected exposure parameter is possible in accordance with a rotation of the main electronic dial 71. The setting value is changed by one level in response to a predetermined amount (one gauge) of operation performed on the main electronic dial 71. If the changing operation has been performed, the procedure moves to step S306, otherwise the procedure moves to step S308. Note that, even if "Auto" is set for an exposure parameter during the AE lock, a control value will be immediately set based on a photometry result.

In step S306, the system control unit 50 changes the control value, stored in the system memory 52, of the exposure parameter to be subjected to the changing operation in step S305B or an originally recorded setting value thereof, and stores the changed value as a setting value in the system memory 52. Furthermore, in step S306, the setting value of the exposure parameter, displayed on the display unit 28, that has been subjected to the changing operation is changed. If the exposure parameter whose setting value has been changed in step S305B is a parameter that was set to "Auto" at the time of photometry and had a control value, the control value calculated based on the photometry will be changed based on the amount of operation performed by the user. In other words, if the aperture value set to "Auto" is calculated as "2.0" based on the photometry, and then an operation to change the setting value is performed by the user, the aperture value will be changed from "2.0" based on the amount of operation. Furthermore, if an exposure parameter for which, instead of "Auto", a setting value was originally set by a user operation at the time of photometry has been subjected to the setting change in step S305B, the changed setting value is stored in the system memory 52. For example, if an operation to change the shutter speed from 1/1000 seconds to 1/800 seconds was performed in S305B, the display screen of the display unit 28 changes from that in FIG. 5B to FIG. 5C.

In step S307, the system control unit 50 stores, with respect to an exposure parameter for which a control value was set, the control value as a setting value in the system memory 52. The processing in step S307 is performed on, of the exposure parameters whose values were not changed in step S305B, an exposure parameter for which a control value was set. That is to say, if the value of any one of the exposure parameters was changed in the processing in step S305B, an exposure parameter that was set to "Auto" at the time of photometry and for which a control value was set is recorded as a setting value. In other words, if the user has performed an operation to change an exposure parameter during the AE lock, all of the exposure parameters will be recorded as setting values. Because the user has performed an operation to change the value of an exposure parameter after the photometry, there is a possibility that the user will want to change the setting of the exposure parameters based on the calculated values of the correct exposure. Accordingly, a configuration is employed such that even the exposure parameter set to "Auto" is recorded as the value calculated by the digital camera 100 as the correct exposure, and unless the setting value is changed by the user, the setting value is kept without returning to "Auto" even after the AE lock is cancelled. For example, after setting all of the Av, the Tv, and the ISO speed to "Auto" and setting all of the exposure parameters to the correct exposure in accordance with an AE lock instruction, the user can make slight change to the aperture value to change the degree of blurring. Accordingly, the user only needs to configure settings up to the correct exposure at one time and then change the setting of the value from the correct exposure value, instead of performing an operation to set the setting values one by one to desired values, and thus the user can quickly configure settings with a small amount of operation. Furthermore, if the setting value (control value) of any of the exposure parameters has been changed during the AE lock, the control values of other exposure parameters are also recorded as setting values, and thus the user can keep the settings of the desired exposure parameters. If the shutter speed and the aperture value were both set to "Auto", and the value of the shutter speed is changed during the AE lock and then the aperture value returns to "Auto" after cancellation of the AE lock, the relationship between the shutter speed and the aperture value that have been adjusted by the user based on the correct exposure will be broken. On the other hand, if, as in step S307, the aperture value is recorded as a setting value, instead of being set to "Auto", upon the user adjusting the shutter speed based on the correct exposure, the exposure setting adjusted by the user during the AE lock can be maintained.

In step S308, the system control unit 50 determines whether or not to cancel the AE lock. For example, the system control unit 50 determines that the AE lock is to be cancelled if the user has given an AE lock cancellation instruction, or if a predetermined time period has elapsed from when the AE lock instruction was given in step S302, for example. If the AE lock is to be cancelled, the procedure moves to step S309, otherwise the procedure moves to step S305A.

Figure 5A:
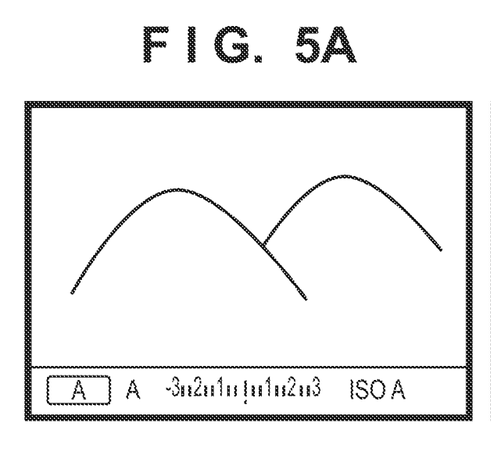
FIGS. 5A to 5D are diagrams illustrating examples of display screens of the digital camera 100.
Figure 5B:
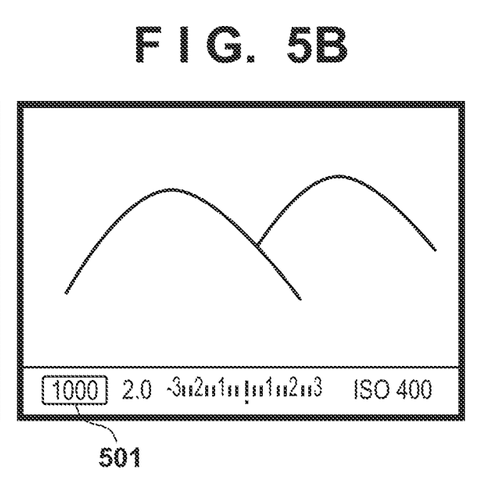
Figure 5C:
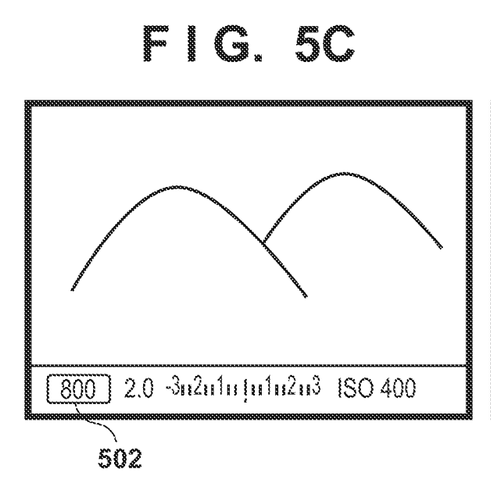

In step S309, the system control unit 50 deletes the control values of the exposure parameters from the system memory 52. Since the control values are determined based on the photometry result in step S303, they are deleted from the system memory 52 in response to the cancellation of the AE lock. Accordingly, when photometry is next performed, with respect to an exposure parameter whose setting value is set to "Auto", a new control value is determined again based on the photometry result. For example, a case is considered where the display screen of the display unit 28 in the state shown in FIG. 5A is subjected to the photometry in step S303 and transitions to the state shown in FIG. 5B, and then the AE lock is cancelled without performing the exposure parameter changing operation (step S305B). In this case, as a result of the control values being deleted in step S309, the display screen of the display unit 28 returns from the state shown in FIG. 5B to the state shown in FIG. 5A. On the other hand, if, after having transitioned to the state show in FIG. 5B, the display screen of the display unit 28 transitions to the state show in FIG. 5C in accordance with the exposure parameter changing operation (step S305B), all of the exposure parameters will have setting values other than "Auto". Accordingly, also after the processing in step S309, the display screen of the display unit 28 does not return to the state shown in FIG. 5A and remains in the state shown in FIG. 5C.

In step S310A, similar to step S305A, the system control unit 50 determines whether or not the operation to change an exposure parameter for selection has been performed. Changing of an exposure parameter for selection is possible in accordance with a rotation of the sub electronic dial 73. If no such operation has been made in step S310A, the exposure parameter selected when the AE lock instruction was given in step S302 remains selected, and in the next processing in step S310B, the value of the selected exposure parameter is changed. Note that the shutter speed may be set as the exposure parameter that is initially selected when the digital camera 100 is powered on.

In step S310B, the system control unit 50 determines whether or not an operation to change various setting values has been made. The various setting values include setting values of exposure parameters, other setting values that can be changed in the shooting standby state, and the like. If the operation to change various setting values has been performed, the procedure moves to step S311, otherwise the procedure moves to step S312. During a time period other than when the AE lock is active, it is possible to set the setting values to "Auto" in which control values are set so that a correct exposure is achieved based on photometry, or to setting values other than "Auto".

In step S311, the system control unit 50 updates the setting values to be subjected to the changing operation in step S310B, and stores the updated setting values in the system memory 52. Then, the procedure returns to step S302.

In step S312, the system control unit 50 determines whether or not a shooting operation has been performed. If a shooting operation has been performed, the procedure moves to step S313, otherwise the procedure moves to step S316.

In steps S313 and S314, similar to steps S303 and S304, the system control unit 50 respectively performs photometry, and determination and storage of the control values of the exposure parameters that were set to "Auto".

In step S315, the system control unit 50 performs shooting. In step S315, an image captured by the image capturing unit 22 is recorded in the recording medium 200. As shooting processing, the system control unit 50 sequentially performs the above-described processing that is performed when the first shutter switch 62 is turned on, and the above-described processing that is performed when the second shutter switch 64 is turned on.

In step S316, the system control unit 50 determines whether or not an operation to switch the operation mode has been performed in accordance with the operation of the mode selection switch 60. If no such switching operation has been performed, the procedure returns to step S302. If such a switching operation has been performed, the procedure of this flowchart is ended. That is to say, the exposure adjustment processing in the exposure adjustment mode is ended.

Note that, in the description above, exposure parameters (exposure control-related setting items) are employed as examples of setting items, and setting values are assumed to be automatically set for the exposure parameters that have the setting value of "Auto", in accordance with an AE lock instruction. However, in the present embodiment, the setting items are not limited to the exposure parameters, and the trigger to automatically set the setting values of the setting items set to "Auto" is not limited to an AE lock instruction. The present embodiment is applicable to an arbitrary configuration in which setting values of setting items set to "Auto" are automatically set upon the start of an operation in a predetermined operation mode. For example, the setting items may be setting items relating to the ranging point of automatic focus, or setting items relating to automatic white balance.

Moreover, the description above has explained a configuration in which, by distinguishing a setting value and a control value, an exposure parameter that was set to "Auto" can return to "Auto" in response to cancellation of the AE lock (at the end of an operation in the predetermined operation mode). However, the present invention is not particularly limited to a specific implementation, and it is also possible to add, for example, a flag to the exposure parameter that was set to "Auto" prior to the start of the AE lock, instead of strictly distinguishing between a setting value and a control value. Any configuration may be employed as long as a specific value of an exposure parameter that was set to "Auto" is automatically set based on a photometry result, and, if no changing operation is performed during the AE lock, the exposure parameter will return to "Auto" after cancellation of the AE lock.

Note that a configuration is also possible in which the setting item that was set to "Auto" when an AE lock instruction was given in step S302 returns to "Auto" after a predetermined time period has elapsed even if a setting value has been set after cancellation of the AE lock in step S308. In other words, a setting item for which the value of the correct exposure value (control value) is set as a setting value from "Auto" as a result of the setting value of another setting item having been changed during the AE lock is changed to "Auto" after a predetermined time period has elapsed, instead of being changed to "Auto" in response to the cancellation of the AE lock. Accordingly, shooting can be continued with the set (fixed) values for a certain amount of time such as 10 seconds or 15 seconds after the AE lock, for example. Furthermore, since the value returns again to "Auto" when a predetermined time period has elapsed, the setting of the correct exposure can be achieved in accordance with an AE lock instruction when a time period has elapsed and the shooting environment has changed.

Furthermore, unit for setting values of exposure parameters to "Auto" may also be provided. For example, a button for setting a selected exposure parameter to "Auto" and a button for setting all of the exposure parameters to "Auto" may be provided. With them, a user can easily configure setting to "Auto" so that the correct exposure values are set (calculated) prior to each shooting event, and thus it is possible to immediately set the values to desired setting values even if the shooting state (exposure state) has changed. Specifically, by achieving the correct exposure in a bright place, and then adjusting the setting values to set all of the exposure parameters to "Auto" at one time, it is possible to easily make changes such that the correct exposure is achieved and the setting values are adjusted, even in a dark place.

As a result of the system control unit 50 performing control as described with reference to FIGS. 3A and 3B, a user can change an exposure parameter determined by the digital camera 100 so that the correct exposure is achieved, to a desired value, and can perform shooting. Accordingly, the user can quickly make fine adjustments to exposure.

Note that the system control unit 50 may also have a function of executing photometry alone in step S303 or S313, holding the obtained photometry results as control values, updating the control values directly obtained from the photometry result in accordance with a control value changing instruction being given, and reflecting the updated control values in shooting control. In this case, the function is enabled in accordance with the start of the photometry. Accordingly, the system control unit 50 has the function of, upon completion of a photometry state and a photometry timer state, in which the photometry state is continued for a predetermined time period, discarding the control values acquired in accordance with the photometry and the control value changing instruction, and returning to a shooting standby state. Such functions can both be provided in the first embodiment, and a second embodiment, which will be described later.

Figure 4:
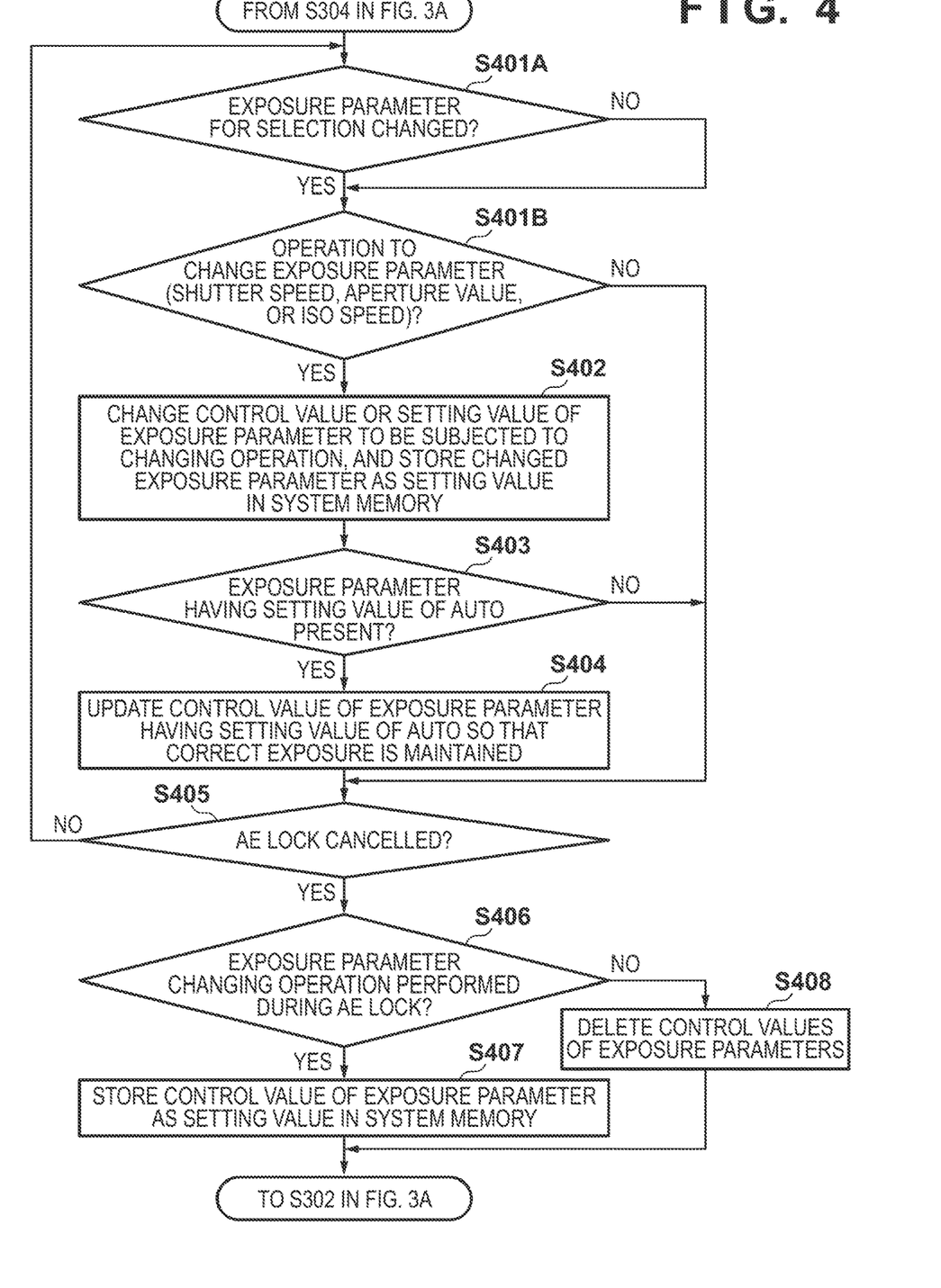
FIG. 4 is a flowchart of exposure adjustment processing according to a second embodiment.

Furthermore, the system control unit 50 may also display an exposure meter on the display unit 28 when the control value is stored as a setting value in step S306. The exposure meter indicates how much the exposure deviates from the correct exposure when shooting is performed with the current setting values. If the exposure deviates too much from the correct exposure, the system control unit 50 performs blinking display or the like to clearly draw attention to the possibility that the shot image will be too bright or too dark and a subject in the shot image may be invisible. Also, in step S407 of the second embodiment, which will be described later, an exposure meter may also be displayed.

As described above, according to the first embodiment, the digital camera 100 automatically sets setting values of exposure parameters that were set to "Auto" in accordance with an AE lock instruction. Here, the values that are automatically set may be control values, which are distinguishable from setting values, but, as described above, it is not necessary to strictly distinguish between the setting values and the control values. The digital camera 100 changes, during the AE lock (operation in a predetermined operation mode), the setting value of any of the exposure parameters in accordance with a user instruction. If no such change in an exposure parameter is performed during the AE lock in accordance with a user instruction, the digital camera 100 returns the exposure parameter that was set to "Auto" at the start of the AE lock to the setting of "Auto", in response to cancellation of the AE lock. Accordingly, the operability is improved when a plurality of setting items are set.

Second Embodiment

Hereinafter, exposure adjustment processing according to the second embodiment will be described. In the second embodiment, the basic configuration of a digital camera 100 is the same as that of the first embodiment (see FIGS. 1A and 1B, and 2). The following will mainly describe differences from the first embodiment.

FIG. 4 is a flowchart of the exposure adjustment processing executed by the digital camera 100. The procedure from steps S401A to S406 in FIG. 4 replaces steps from S305A to S309 in FIG. 3A. In other words, in the second embodiment, the same procedures as that from steps S301 to S304 of FIG. 3A and from steps S310A to S316 of FIG. 3B of the first embodiment are executed. The processing in each step of the flowchart in FIG. 4 is realized, unless otherwise noted, by the system control unit 50 expanding the program stored in the nonvolatile memory 56 onto the system memory 52 and executing the expanded program. Furthermore, the procedure of the present flowchart starts upon an exposure adjustment mode being set by the digital camera 100.

Subsequently from the processing in step S304 in FIG. 3A, in step S401A, the system control unit 50 determines whether or not an operation to change the exposure parameter for selection has been made. Changing of the exposure parameter for selection is possible in accordance with a rotation of the sub electronic dial 73. If no such operation in step S401A has been made, the state is such that the exposure parameter that was selected when the AE lock instruction was given in step S302 remains selected, and in the next processing in step S401B, the value of the selected exposure parameter is changed. Note that the shutter speed may be set as the exposure parameter that is initially selected when the digital camera 100 is powered on.

In step S401B, the system control unit 50 determines whether or not an operation to change any of the exposure parameters (the shutter speed, the aperture value, or the ISO speed) has been performed. If the changing operation has been performed, the procedure moves to step S402, otherwise the procedure moves to step S405. Note that, in the present embodiment, the user may also perform an operation to change any of the exposure parameters to "Auto".

In step S02, the system control unit 50 changes the control value of the exposure parameter to be subjected to the changing operation in S401E or an originally recorded setting value thereof, and stores the changed value as a setting value in the system memory 52.

In step S403, the system control unit 50 determines whether or not there is an exposure parameter that has the setting value of "Auto". If there is such an exposure parameter, the procedure moves to step S404, and if there is no such exposure parameter, the procedure moves to step S405.

Figure 5D:
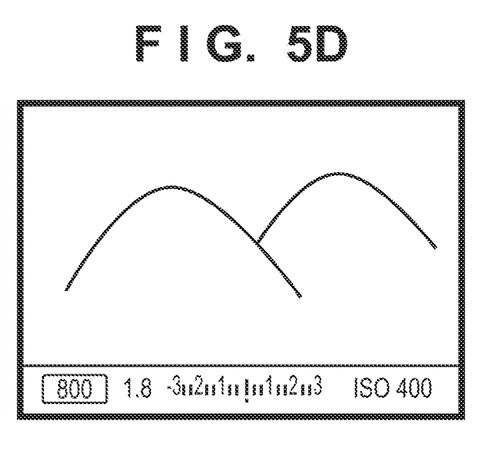

In step S404, the system control unit 50 updates the control value of the exposure parameter that has the setting value of "Auto" so that the exposure does not change (the correct exposure is maintained). For example, a case is considered in which the display screen of the display unit 28 transitions from that in FIG. 5A to FIG. 5B in accordance with the processing in step S304, an operation to change the shutter speed from 1/1000 seconds to 1/800 seconds is performed in step S401B, and the display screen transitions from FIG. 5B to FIG. 5C. In this case, the setting value of the shutter speed is 1/800 seconds, but the setting values of the aperture value and the ISO speed remain as "Auto". Accordingly, in step S404, processing for updating the control values of the aperture value and the ISO speed is executed so that the correct exposure is maintained. As a result, the display screen of the display unit 28 enters the state in which, for example, the aperture value has changed from 2.0 to 1.8, as shown in FIG. 5D.

In step S405, the system control unit 50 determines whether or not to cancel the AE lock. For example, the system control unit 50 determines that the AE lock is to be cancelled if the user has given an AE lock cancellation instruction, or if a predetermined time period has elapsed from when the AE lock instruction was given in step S302, for example. If the AE lock is to be cancelled, the procedure moves to step S406, otherwise the procedure moves to step S401A.

In step S406, the system control unit 50 determines whether or not an exposure parameter changing operation has been made during the AE lock. If an exposure parameter changing operation has been made during the AE lock, the procedure moves to step S407, otherwise the procedure moves to step S408.

In step S407, the system control unit 50 stores the control values of the exposure parameters stored in the system memory 52 as setting values in the system memory 52. Accordingly, all of the exposure parameters have setting values other than "Auto". For example, as described with reference to step S404, when the display screen of the display unit 28 is in the state shown in FIG. 5D, the state shown in FIG. 5D is maintained also after the AE lock has been cancelled.

In step S408, the system control unit 50 deletes the control values of the exposure parameters from the system memory 52. Since the control values are determined based on the photometry result in step S303, they are deleted from the system memory 52 in response to the cancellation of the AE lock. Accordingly, when photometry is next performed, with respect to an exposure parameter whose setting value is set to "Auto", a new control value is determined again based on the photometry result. For example, a case is considered where the display screen of the display unit 28 in the state shown in FIG. 5A is subjected to the photometry in step S303 and transitions to the state shown in FIG. 5B, and then the AE lock is cancelled without performing the exposure parameter changing operation (S401B). In this case, as a result of the control value being deleted in step S408, the display screen of the display unit 28 returns from the state shown in FIG. 5B to the state shown in FIG. 5A.

Note that, in the processing in step S404 for updating the control values of the exposure parameters so that the correct exposure is maintained, the system control unit 50 can determine the updated control values based on control information acquired from the nonvolatile memory 56. Alternatively, it is also possible for a user to designate which of the shutter speed, the aperture value, and the ISO speed is set as the exposure parameter to be updated so that the correct exposure is maintained, and in this case, the system control unit 50 updates the control value in accordance with the designation of the user.

As a result of the system control unit 50 performing control as described with reference to FIG. 4, a user can change one of the exposure parameters determined by the digital camera 100 so that the correct exposure is achieved, to a desired value, and can perform shooting. Accordingly, the user can quickly make fine adjustments to exposure. Particularly, in the second embodiment, with the processing in steps S403 and S404, it is possible for the user to perform fine adjustment of a specific exposure parameter and perform shooting with control values for maintaining the correct exposure.

As described above, in the second embodiment, if an exposure parameter has been changed in accordance with a user instruction during the AE lock, the digital camera 100 updates an automatically set or updated setting value of the exposure parameter so that the exposure does not change between before and after the changing operation. Accordingly, the operability is improved when a plurality of setting items are set.

Note that the various types of control that have been described as being performed by the system control unit 50 may be performed by a single piece of hardware, or by a plurality of pieces of hardware sharing processing to control the entire apparatus.

Although the present invention has been elaborated above based on suitable embodiments thereof, the present invention is by no means limited to these specific embodiments and includes various modifications without departing from the concept of the present invention. Furthermore, the above embodiments are merely illustrative embodiments of the present invention, and may be combined where appropriate.

The foregoing embodiments have dealt with examples in which the present invention is applied to the digital camera 100, but are not limited to these examples, and the present invention is applicable to any electronic device having a plurality of setting items. That is to say, the present invention is applicable to, for example, the following apparatuses: a personal computer, a PDA, a mobile telephone terminal, a portable image viewer, a printer device having a display, a digital photo frame, a music player, and the like. Furthermore, the present invention is also applicable to a game console, an e-book reader, a tablet terminal, a smartphone, a projector, a home electric appliance that has a display, an on-board apparatus that has a display, and the like.

Other Embodiments

Embodiment(s) of the present invention can also be realized by a computer of a system or apparatus that reads out and executes computer executable instructions (e.g., one or more programs) recorded on a storage medium (which may also be referred to more fully as a 'non-transitory computer-readable storage medium') to perform the functions of one or more of the above-described embodiment(s) and/or that includes one or more circuits (e.g., application specific integrated circuit (ASIC)) for performing the functions of one or more of the above-described embodiment(s), and by a method performed by the computer of the system or apparatus by, for example, reading out and executing the computer executable instructions from the storage medium to perform the functions of one or more of the above-described embodiment(s) and/or controlling the one or more circuits to perform the functions of one or more of the above-described embodiment(s). The computer may comprise one or more processors (e.g., central processing unit (CPU), micro processing unit (MPU)) and may include a network of separate computers or separate processors to read out and execute the computer executable instructions. The computer executable instructions may be provided to the computer, for example, from a network or the storage medium. The storage medium may include, for example, one or more of a hard disk, a random-access memory (RAM), a read only memory (ROM), a storage of distributed computing systems, an optical disk (such as a compact disc (CD), digital versatile disc (DVD), or Blu-ray Disc (BD)™), a flash memory device, a memory card, and the like.

While the present invention has been described with reference to exemplary embodiments, it is to be understood that the invention is not limited to the disclosed exemplary embodiments. The scope of the following claims is to be accorded the broadest interpretation so as to encompass all such modifications and equivalent structures and functions.

This application claims the benefit of Japanese Patent Application No. 2017-195377, filed Oct. 5, 2017, which is hereby incorporated by reference herein in its entirety.

What is claimed is:

1. An electronic device comprising at least one memory and at least one processor which function as:
   a changing unit configured to change a setting value of a setting item selected from a plurality of setting items to a setting value that is selected, in accordance with a user operation, from among a plurality of setting values, wherein auto setting mode is one of the plurality of setting values;
   a determination unit configured to automatically determine, a determined setting value, other than auto setting mode, from among the plurality of setting values for a first setting item selected from the plurality of setting items, wherein the auto setting mode was previously applied to the first setting item as the setting value; and a control unit configured to perform control such that, when, in a state in which the determined setting value of the first setting item for which auto setting mode was set previously applied to has been automatically determined, a user operation is made to change a setting value of a second setting item, different from the first setting item, the setting value of the first setting item is not changed due to the changing of the setting value of the second setting item, wherein the control unit is configured to perform control such that, upon the elapsing of a predetermined time period in which the determined setting value of the first setting item is automatically determined, the setting value of the first setting item is changed to the auto setting mode.

2. The electronic device according to claim 1, wherein the control unit is configured to perform control such that, if a setting value the first setting item has been changed by the changing unit during the predetermined time period in accordance with a user operation, the setting value of the first setting item for which the determined setting value has been determined by the determination unit is not changed to the auto setting mode upon the predetermined time period elapsed.

3. The electronic device according to claim 1, wherein the determination unit is configured to automatically determine the determined setting value in accordance with a predetermined instruction.

4. The electronic device according to claim 3, wherein the predetermined time period is a time period from a point in time when the predetermined instruction is accepted to a point in time when a predetermined time elapses, or a time period from the point in time when the predetermined instruction is accepted to a point in time when the predetermined instruction is cancelled.

5. The electronic device according to claim 3, wherein the predetermined instruction is an AE lock instruction.

6. The electronic device according to claim 1, wherein the control unit is configured to perform control such that if a setting value of at least one of the plurality of setting items has been changed by the changing unit during the predetermined time period in accordance with a user operation, the determined setting value automatically determined by the determination unit is not changed to the auto setting mode even upon the predetermined time period elapsing.

7. The electronic device according to claim 1, wherein the control unit is configured to perform control such that setting values respectively set for the plurality of setting items are displayed on a display unit.

8. The electronic device according to claim 1, wherein the at least one memory and the at least one processor function as:

a storage unit configured to store, for each of the plurality of setting items, a respective determined setting value and a respective control value, each of the respective determined setting values being determined by the determination unit, wherein the control unit is configured to perform control such that, if the control value is stored in the storage unit and a setting value of at least one of the plurality of setting items has been changed by the changing unit in accordance with a user operation, the control value is stored as a setting value for a setting item wherein the auto setting mode was previously stored as the setting value for the setting item.

9. The electronic device according to claim 1, wherein the plurality of setting items are setting items relating to exposure control of an image capturing unit.

10. The electronic device according to claim 9, wherein the plurality of setting items include a shutter speed, an aperture value, and an ISO speed.

11. The electronic device according to claim 9, further comprising:

the image capturing unit.

12. A control method executed by an electronic device, comprising:

changing a setting value of a setting item selected from a plurality of setting items to a setting value that is selected, in accordance with a user operation, from among a plurality of setting values, wherein auto setting mode is one of the plurality of setting values;

automatically determining, a determined setting value, other than the auto setting mode, from among the plurality of setting values for a first setting item selected from the plurality of setting items, wherein the auto setting mode was previously applied to the first setting item as the setting value; and performing control such that, when, in a state in which the determined setting value of the first setting item for which the auto setting mode was set Dreviously applied to has been automatically determined, a user operation is made to change a setting value of a second setting item, different from the first setting item, the setting value of the first setting item is not changed due to the changing of the setting value of the second setting item, wherein, upon the elapsing of a predetermined time period in which the determined setting value of the first setting item is automatically determined, the setting value of the first setting item is changed to the auto setting mode.

13. A non-transitory computer-readable storage medium which stores a program for causing a computer to execute a control method comprising:

changing a setting value of a setting item selected from a plurality of setting items to a setting value that is selected, in accordance with a user operation, from among a plurality of setting values, wherein auto setting mode is one of the plurality of setting;

automatically determining, a determined setting value, other than the auto setting mode, from among the plurality of setting values for a first setting item selected from the plurality of setting items, wherein the auto setting mode was previously applied to the first setting item as the setting value;

and performing control such that, when, in a state in which the determined setting value of the first setting item for which the auto setting mode was previously applied to has been automatically determined, a user operation is made to change a setting value of a second setting item, different from the first setting item, the setting value of the first setting item is not changed due to the changing of the setting value of the second setting item, wherein, upon the elapsing of a predetermined time period in which the determined setting value of the first setting item is automatically determined, the setting value of the first setting is changed to the auto setting mode.

* * * * *